US009642386B2

(12) United States Patent
Boebst et al.

(10) Patent No.: US 9,642,386 B2
(45) Date of Patent: May 9, 2017

(54) DEVICE FOR CONTROLLING THE TEMPERATURE OF PRODUCTS TO BE FROZEN

(75) Inventors: Benjamin Boebst, Mittelbiberach (DE); Frank Boettger, Ravensburg (DE)

(73) Assignee: ARZNEIMITTEL GMBH APOTHEKER VETTER & CO. RAVENSBURG, Ravensburg (DE)

(*) Notice: Subject to any disclaimer, the term of this patent is extended or adjusted under 35 U.S.C. 154(b) by 198 days.

(21) Appl. No.: 12/675,062

(22) PCT Filed: Aug. 9, 2008

(86) PCT No.: PCT/EP2008/006591
§ 371 (c)(1),
(2), (4) Date: Feb. 24, 2010

(87) PCT Pub. No.: WO2009/030341
PCT Pub. Date: Mar. 12, 2009

(65) Prior Publication Data
US 2011/0107616 A1    May 12, 2011

(30) Foreign Application Priority Data
Aug. 28, 2007 (DE) .......................... 10 2007 040 489

(51) Int. Cl.
| F26B 5/06 | (2006.01) |
| A23L 3/36 | (2006.01) |
| A23L 3/44 | (2006.01) |
| F25B 21/02 | (2006.01) |

(52) U.S. Cl.
CPC .................. *A23L 3/363* (2013.01); *A23L 3/44* (2013.01); *F25B 21/02* (2013.01); *F26B 5/06* (2013.01); *A23V 2002/00* (2013.01)

(58) Field of Classification Search
CPC .. F26B 5/06; F25B 21/02; A23L 3/363; A23L 3/44; A23V 2002/00

USPC ............ 34/284, 287, 289, 296, 297, 92, 239
See application file for complete search history.

(56) References Cited

U.S. PATENT DOCUMENTS

| 3,247,602 A | 4/1966 | Hamilton et al. |
| 3,261,110 A | 7/1966 | Fuentevilla |
| 5,779,981 A | 7/1998 | Danssaert et al. |
| 6,148,536 A * | 11/2000 | Iijima ............................... 34/92 |

(Continued)

FOREIGN PATENT DOCUMENTS

| DE | 1604853 B1 | 7/1970 |
| DE | 1928973 A1 | 12/1970 |

(Continued)

OTHER PUBLICATIONS

English translation of the IPRP, issued Mar. 24, 2010, which includes the English translation of the Written Opinion of the ISA, mailed Feb. 12, 2009.

*Primary Examiner* — Jiping Lu
(74) *Attorney, Agent, or Firm* — Stephen T. Olson; Harness, Dickey & Pierce, P.L.C.

(57) ABSTRACT

A device for controlling the temperature of products to be frozen during a freeze drying process includes a plurality of Peltier elements and at least one magazine including different areas for accommodating products to be frozen. The Peltier elements are separably controllable such that the different areas of the magazine are maintainable at different temperatures during a freeze drying process.

27 Claims, 1 Drawing Sheet

(56) References Cited

U.S. PATENT DOCUMENTS

| | | | |
|---|---|---|---|
| 6,341,490 B1 | 1/2002 | Jones | |
| 6,724,791 B1* | 4/2004 | Chiappetta et al. | 372/36 |
| 6,933,004 B2* | 8/2005 | Chan et al. | 427/126.3 |
| 2006/0028182 A1* | 2/2006 | Yang et al. | 320/150 |
| 2006/0053652 A1 | 3/2006 | Gyory et al. | |
| 2007/0060875 A1 | 3/2007 | Bassarab et al. | |
| 2007/0060876 A1 | 3/2007 | Bassarab et al. | |
| 2007/0060877 A1 | 3/2007 | Bassarab et al. | |
| 2007/0116600 A1* | 5/2007 | Kochar et al. | 422/65 |
| 2007/0129673 A1 | 6/2007 | Bassarab et al. | |
| 2008/0023331 A1* | 1/2008 | Hattori | 204/451 |
| 2009/0182301 A1 | 7/2009 | Bassarab et al. | |
| 2011/0207140 A1* | 8/2011 | Handique et al. | 435/6.12 |

FOREIGN PATENT DOCUMENTS

| | | |
|---|---|---|
| DE | 260120 A1 | 9/1988 |
| DE | 60207688 | 12/2003 |
| DE | 102006019641 A1 | 11/2006 |
| EP | 1366327 A1 | 12/2003 |
| EP | 1464401 A1 | 10/2004 |
| GB | 1017116 A | 1/1966 |
| GB | 1062031 | 3/1967 |
| GB | 1173720 A | 12/1969 |
| WO | WO-89/12502 A1 | 12/1989 |
| WO | WO-2007/020237 | 2/2007 |
| WO | WO-2007/020238 A2 | 2/2007 |
| WO | WO-2007/020239 A1 | 2/2007 |
| WO | WO-2007/020240 A1 | 2/2007 |

* cited by examiner

DEVICE FOR CONTROLLING THE TEMPERATURE OF PRODUCTS TO BE FROZEN

CROSS-REFERENCE TO RELATED APPLICATIONS

This application is a 371 U.S. National Stage of International Application No. PCT/EP2008/006591, filed Aug. 9, 2008. This application claims the benefit of German Patent Application No. 10 2007 040 489.3, filed Aug. 28, 2007, the disclosures of which application are incorporated herein by reference.

FIELD

The invention relates to a device for controlling the temperature of products to be frozen in accordance with the pre-characterizing portion of claim 1.

BACKGROUND

Devices of the type discussed here are known. They are used for controlling the temperature of products to be frozen in freeze driers. In known freeze driers, a magazine is disposed on a storage space in the freeze drier during the freeze drying process. The magazine preferably comprises a plurality of receptacle areas for accommodating products to be frozen, in particular pharmaceutical solutions, that are disposed in pharmaceutical containers. The storage space comprises channels in which a temperature-controllable medium such as, for example, silicon oil, circulates. The temperature of the magazine is controlled via the storage space. During the freeze drying process, the product to be frozen is initially deep frozen. A primary drying follows, with the ice of the frozen product, for example, a pharmaceutical solvent, being sublimated. In a subsequent secondary drying, the water portion in the frozen product is further reduced, such that a solid substance remains, known as a lyophilisate. Pharmaceutical solutions in particular may be conserved gently and over long periods of time and, if necessary, may simply be dissolved again in a solvent, for example, water. The various phases that the product to be frozen undergoes during the freeze drying process are controlled, on the one hand, by the temperature of the product to be frozen and, on the other hand, by the pressure in the freeze drier. As already mentioned above, the temperature of the product to be frozen is controlled here by the temperature-controllable medium provided in the storage space. Due to their different compositions, various pharmaceutical solutions require different temperature and pressure progressions during the freeze drying process in order to be convertible to high-quality lyophilisate. In known freeze dryers, a large number of trial runs is necessary to find the optimal temperature and pressure progression for a newly developed pharmaceutical solution. For this reason, the test phase for the freeze drying process takes a very long time.

SUMMARY

The object of the invention is therefore to create a device for controlling the temperature of products to be frozen that considerably shortens the test phase of products to be freeze dried.

In order to attain this object, the invention proposes a device for controlling the temperature of products to be frozen having the features of claim 1. This device is characterized by at least one Peltier element. This advantageously allows the temperature control of products to be frozen during the freeze drying process to be structured in an extremely flexible fashion, resulting in a considerable shortening of the test phase, in particular of a newly developed pharmaceutical solution.

A device is particularly preferred that is characterized in that the at least one Peltier element is disposed between at least one magazine comprising receptacles for accommodating products to be frozen and a placement surface. This design allows for a particularly simple design and a particularly cost-effective implementation of a device for controlling the temperature of products to be frozen.

A device is also preferred that is characterized in that at least two Peltier elements are provided. By the use of at least two Peltier elements, it is advantageously possible to provide different temperatures in different areas of the freeze drier during a freeze drying process, i.e., to selectively control the temperature of at least one magazine. Thus, it is possible to test at least two temperature progressions for a product to be frozen or even for multiple products to be frozen during a single freeze drying process.

A device is also preferred that is characterized in that a Peltier element is associated with at least one receptacle area of a magazine. It is therefore quite conceivable for the temperature of individual receptacle areas, for example, an individual product to be frozen, to be selectively controlled by means of a Peltier element.

In another preferred device, provision is made for a Peltier element to be associated with a plurality of receptacle areas of a magazine. For example, it is conceivable for various pharmaceutical solutions to be subjected to the freeze drying process with the same temperature progression.

A device is also preferred that is characterized in that a Peltier element is associated with precisely one magazine. In particular, provision is made for the Peltier element to have the same dimensions as the magazine.

Moreover, a device is preferred that is characterized in that a Peltier element is associated with a plurality of magazines. In order to better differentiate between different products to be frozen, for example, one magazine may contain a certain product to be frozen, and another magazine may, in contrast, contain a different product to be frozen.

Finally, a device is preferred that is characterized in that a plurality of Peltier elements are associated with one magazine. In particular, a conventional magazine may be provided, with a plurality of Peltier elements being disposed on the storage space upon which the magazine is placed. Via the plurality of Peltier elements, which may be cooled or heated to different extents, it is thus possible for different regions of a single magazine to be subjected to different temperatures.

DRAWINGS

The invention shall be described in greater detail in the following with reference to the drawing, which shows:

DETAILED DESCRIPTION

Figure 1:
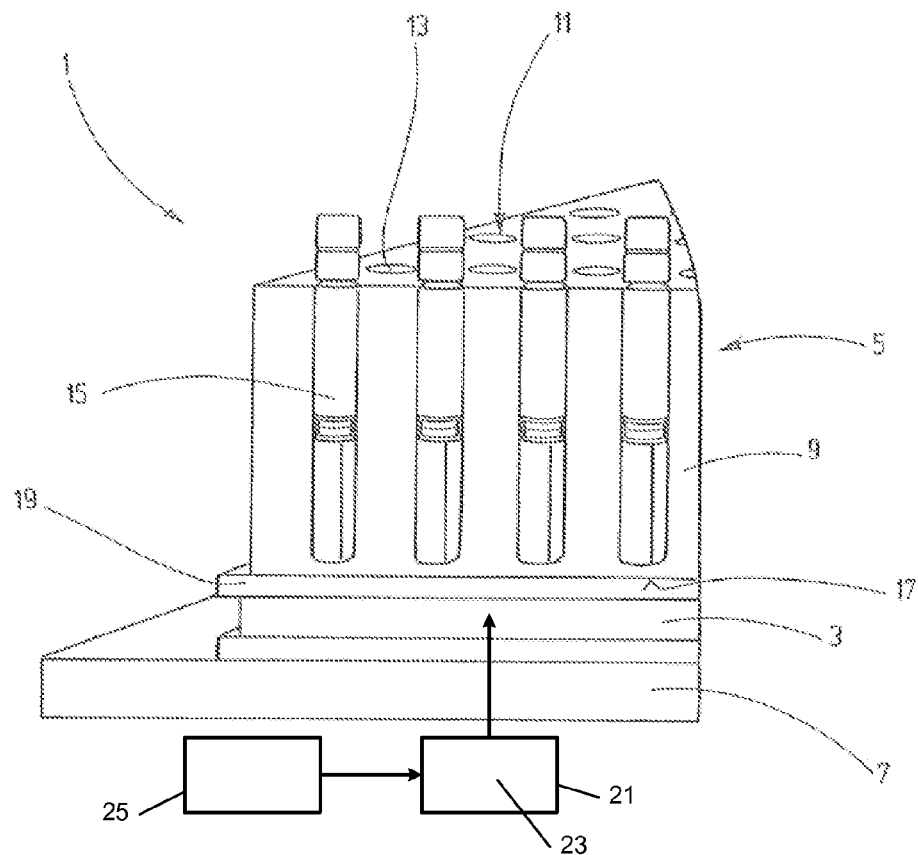
FIG. 1 is a perspective view of a partial region of a device for controlling the temperature of products to be frozen.

FIG. 1 shows a perspective view of a device 1 for controlling the temperature of products to be frozen during a freeze drying process.

The device 1 comprises a Peltier element 3 that is disposed between a magazine 5 and a storage space 7. The storage space 7 is part of a freeze drier, which is not shown. In contrast, the magazine 5 is stored outside of the freeze drier and is located inside the freeze drier only during a freeze drying process. The functionality of Peltier elements is sufficiently known from prior art, such that it need not be discussed in greater detail here.

The magazine 5 comprises a base body 9 and at least one, in this case a plurality of, receptacle areas 11 that are implemented as receptacle openings 13 in the base body 9. The product to be frozen 15 is disposed in the receptacle areas 11 of the magazine 5. In FIG. 1, provision is made for the product to be frozen 15, in particular a pharmaceutical solution, to be placed in a dual-chamber syringe, for example.

The magazine 5 is shown here purely by way of example and may have any desired design. It is only critical that a placement surface 17 of the magazine 5 rest on a metal plate 19 of the Peltier element 3, such that the heat or cold generated by the Peltier element 3 is conducted by the metal plate 19 via the placement surface 17 and the base body 9 of the magazine 5 to the product to be frozen 15.

The Peltier element 3 is preferably connected to an actuating unit 21 that determines the current through the Peltier element 3 and thus the temperature of the metal plate 19.

Figure 2:
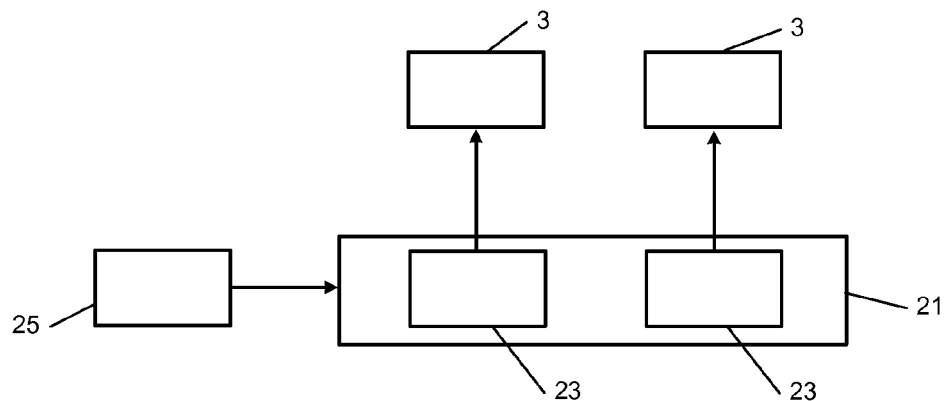
FIG. 2 is a functional block diagram of a portion of a device for controlling the temperature of products to be frozen.

At least one Peltier element 3 is preferably disposed between the magazine 5 and the storage space 7. In particular, a plurality of Peltier elements 3 are disposed on the storage space 7, each of which may be actuated by separate actuating elements 23, as shown in FIG. 2, and thus are able to have different temperatures. Either one magazine 5 preferably covering the Peltier elements 3 completely or a plurality of smaller magazines 5 may be provided on a plurality of Peltier elements 3. In particular, provision is made for precisely one Peltier element 3 to be associated with one magazine 5. Here, the magazine 5 preferably has the same dimensions as the Peltier element 3.

As is shown in FIG. 1, the magazine 5 preferably comprises a plurality of receptacle areas 11. A plurality of receptacle areas 11 of one or more magazines 5 may be associated with one Peltier element 3. However, provision may also be made for one Peltier element 3 to be associated with precisely one receptacle area 11.

One Peltier element 3 may also be associated with a plurality of magazines 5; this may be advantageous for differentiation when different products to be frozen are disposed in different magazines but are to be subjected to the same temperature.

As was already discussed above, a conventional magazine 5 and a conventional placement surface 7 may be provided for the device 1 proposed here for controlling the temperature of products to be frozen 15. In order to realize the device 1 proposed here, it is merely necessary to provide one or more Peltier elements 3 on the placement surface 7 and to dispose at least one magazine 5 on the at least one Peltier element 3. The device 1 for controlling the temperature of products to be frozen may therefore be realized in a particularly easy and cost-effective fashion.

The present invention allows for the temperature of individual regions of a freeze drier, in particular individual regions of a magazine 5 or a plurality of magazines 5, to be controlled selectively during one single freeze drying process, i.e., for the products to be frozen disposed in the magazines to be subjected to different temperatures. In this manner, the test phases for newly developed pharmaceutical solutions are significantly shortened because a plurality of temperature progressions may be tested during one single freeze drying process, thus requiring a significantly lower number of test runs until the optimal temperature progression has been found for a solution. It is also conceivable for different pharmaceutical solutions to be dried at different temperatures in the same freeze drying process.

The Peltier element 3 is preferably connected to the actuating unit, which is not shown here and which is able to cooperate with a control unit, which is also not shown here and which measures the temperatures of the product to be frozen 15 and/or the magazine 5 and/or the placement surface 7 via temperature sensors and transmits corresponding signals to the actuating unit. The actuating unit is able to increase, decrease, or reverse the polarity of the current for the Peltier element 3 as a function of the measured temperature values. Thus, it is advantageously possible for a particularly flexible control loop to be created that moreover effects a stable freeze drying process because it is possible to react to fluctuations in the temperature of the product to be frozen 15 in a significantly faster manner.

As has already been stated above, the present invention allows different regions inside a freeze drier, which is not shown, to be subjected to different temperatures and thus to control the temperature of product to be frozen in a selective fashion, such that a freeze drying cycle becomes significantly more efficient.

It is critical that, in different regions of the freeze drier, different temperatures be able to prevail, i.e., for different receptacle areas of a magazine and thus the product to be frozen located therein to be able to be subjected to different temperatures. The device 1 for tempering products to be frozen may be realized in a particularly simple fashion by at least one Peltier element 3 disposed between a placement surface 7 and at least one magazine 5. Moreover, the device allows for the test phase for the freeze drying process, in particular for newly developed pharmaceutical solutions, to be significantly shortened. Furthermore, the metal plate 19 of the Peltier element 3 requires a significantly shorter temperature change period, such that it is possible to react more quickly to temperature fluctuations in the products to be frozen 15.

The invention claimed is:

1. A device for controlling a temperature of products to be frozen during a freeze drying process, the device comprising:
   at least one magazine including different areas for accommodating products to be frozen;
   a plurality of Peltier elements associated with the at least one magazine;
   a control unit that decreases the temperature of the plurality of Peltier elements to generate cold for freezing the products to be frozen during the freeze drying process; and
   a plurality of actuating elements,
   wherein the control unit controls the plurality of actuating elements to actuate the plurality of Peltier elements such that the different areas of the at least one magazine are maintainable at different cold temperatures by the plurality of Peltier elements during the freeze drying process.

2. The device according to claim 1, wherein the plurality of Peltier elements are disposed between a first magazine, which comprises receiving/accommodating areas to receive/accommodate products to be frozen, and a placement plate.

3. The device according to claim 1 wherein at least one area of a magazine is associated with a Peltier element.

4. The device according to claim 1, wherein a plurality of areas of a first magazine of the at least one magazine is associated with a single Peltier element.

5. The device according to claim 1, wherein each Peltier element is associated with exactly one magazine.

6. The device according to claim 1, wherein the at least one magazine includes a plurality of magazines and wherein at least a single one of the Peltier elements is associated with the plurality of magazines.

7. The device according to claim 1, wherein a plurality of Peltier elements is associated with a single magazine.

8. The device of claim 1, further comprising:
an actuating unit operably connected to the plurality of Peltier elements,
wherein the control unit measures temperatures of at least one of the products to be frozen and the at least one magazine and controls the actuating unit in response to the sensed temperatures to control a current of the Peltier elements as a function of the sensed temperatures.

9. The device of claim 8, wherein the actuating unit is operable to increase, decrease or reverse a polarity of a current for the plurality of Peltier elements as a function of the sensed temperatures.

10. The device of claim 1, further comprising a storage space, the plurality of Peltier elements disposed between the at least one magazine and the storage space, the storage space being part of a freeze drier.

11. A device for controlling a temperature of products to be frozen during a freeze drying process, the device comprising:
at least one magazine including a base body having a placement surface, the base body defining a plurality of different areas for accommodating products to be frozen;
a plurality of Peltier elements associated with the at least one magazine;
a control unit that decreases the temperature of the plurality of Peltier elements to generate cold for freezing the products to be frozen during the freeze drying process; and
a plurality of actuating elements,
wherein the control unit controls the plurality of actuating elements to actuate the plurality of Peltier elements such that the different areas of the at least one magazine are maintainable at different temperatures by the plurality of Peltier elements during the dry freezing process, and
wherein at least one of the Peltier elements includes a metal plate, the placement surface of the at least one magazine resting on the metal plate such that cold generated by the plurality of Peltier elements is conducted by the metal plate via the placement surface and the base body of the at least one magazine to the product to be frozen during the freeze drying process.

12. The device according to claim 11, wherein different areas for accommodating products to be frozen are generally cylindrical.

13. The device according to claim 12, wherein the metal plate is horizontally oriented and the generally cylindrical areas for accommodating products to be frozen are oriented generally perpendicular to the metal plate.

14. The device according to claim 11, wherein at least one area of a magazine is associated with a Peltier element.

15. The device according to claim 11, wherein a plurality of areas of a first magazine of the at least one magazine is associated with a single Peltier element.

16. The device according to claim 11, wherein the at least one magazine includes a plurality of magazines and wherein at least a single one of the Peltier elements is associated with the plurality of magazines.

17. The device according to claim 11, wherein a plurality of Peltier elements is associated with a single magazine.

18. The device according to claim 11, in combination with a freeze dryer, the device disposed in the freeze dryer.

19. The device according to claim 11, wherein the base includes an upper surface open to the plurality of different areas for accommodating products to be frozen and a lower surface defining the placement surface.

20. The device according to claim 11, further comprising:
an actuating unit operably connected to the plurality of Peltier elements,
wherein the control unit measures temperatures of at least one of the products to be frozen, the at least one magazine and the placement surface and controls the actuating unit in response to the sensed temperatures to control a current of the Peltier elements as a function of the sensed temperatures.

21. The device of claim 20, wherein the actuating unit is operable to increase, decrease or reverse a polarity of a current for the plurality of Peltier elements as a function of the sensed temperatures.

22. The device of claim 11, further comprising a storage space, the plurality of Peltier elements disposed between the at least one magazine and the storage space, the storage space being part of a freeze drier.

23. A device for controlling a temperature of a product to be frozen during a freeze drying process, the device comprising:
a magazine including a receptacle for accommodating the product to be frozen;
a Peltier element associated with the magazine;
an actuating element associated with the Peltier element, wherein the actuating element includes a plurality of actuating elements and the Peltier element includes a plurality of Peltier elements that are each actuated by separate ones of the actuating elements; and
a control unit that controls the plurality of actuating elements to decrease the temperature of the plurality of Peltier elements to freeze the product to be frozen during the freeze drying process.

24. The device of claim 23, wherein the receptacle includes a plurality of receptacles for accommodating a plurality of products to be frozen.

25. The device of claim 24, wherein each of the receptacles is associated with one of the plurality of actuating elements.

26. The device of claim 24, wherein the control unit controls the plurality of Peltier elements using the plurality of actuating elements to maintain the receptacles of the magazine at different cold temperatures during the freeze drying process.

27. The device of claim 23, further comprising a storage space, the Peltier element disposed between the magazine and the storage space, the storage space being part of a freeze drier.

* * * * *